(12) United States Patent
Boehm

(10) Patent No.: US 10,500,931 B2
(45) Date of Patent: Dec. 10, 2019

(54) LOCATION BASED ADJUSTABLE WINDOWS

(71) Applicant: Gentex Corporation, Zeeland, MI (US)

(72) Inventor: Neil J. Boehm, Allegan, MI (US)

(73) Assignee: GENTEX CORPORATION, Zeeland, MI (US)

( * ) Notice: Subject to any disclaimer, the term of this patent is extended or adjusted under 35 U.S.C. 154(b) by 111 days.

(21) Appl. No.: 15/834,461

(22) Filed: Dec. 7, 2017

(65) Prior Publication Data

US 2018/0162203 A1 Jun. 14, 2018

Related U.S. Application Data

(60) Provisional application No. 62/431,910, filed on Dec. 9, 2016.

(51) Int. Cl.
| | | |
|---|---|---|
| *G02F 1/01* | (2006.01) | |
| *B60J 3/04* | (2006.01) | |
| *B60R 16/037* | (2006.01) | |
| *B60Q 9/00* | (2006.01) | |
| *E06B 9/24* | (2006.01) | |

(52) U.S. Cl.
CPC .............. *B60J 3/04* (2013.01); *B60Q 9/00* (2013.01); *B60R 16/037* (2013.01); *E06B 9/24* (2013.01); *G02F 1/0121* (2013.01); *B60Y 2400/92* (2013.01); *E06B 2009/2464* (2013.01); *G02F 2203/01* (2013.01); *G02F 2203/48* (2013.01)

(58) Field of Classification Search
CPC . G02F 1/0121; G02F 2203/48; G02F 2203/01
See application file for complete search history.

(56) References Cited

U.S. PATENT DOCUMENTS

| | | |
|---|---|---|
| 6,919,866 B2 | 7/2005 | Kanevsky et al. |
| 8,781,676 B2 | 7/2014 | McIntyre, Jr. et al. |
| 9,047,703 B2 | 6/2015 | Beckwith et al. |
| 2012/0145441 A1 | 6/2012 | Kim et al. |
| 2013/0158790 A1* | 6/2013 | McIntyre, Jr. .......... G02F 1/163 701/36 |
| 2014/0148996 A1 | 5/2014 | Watkins |

FOREIGN PATENT DOCUMENTS

WO 2013154295 A1 10/2013

* cited by examiner

*Primary Examiner* — Joseph P Martinez
(74) *Attorney, Agent, or Firm* — Price Heneveld LLP; Bradley D. Johnson

(57) ABSTRACT

A window assembly includes a window having an electro-optic device configured to limit light transmissivity through the window and a geographic positioning system. A controller is in communication with the geographic positioning system and is configured to limit a range of light transmissivity of the electro-optic device based on a location detected by the geographic positioning system. A manual adjustment control configured to allow a user to adjust the light transmissivity of the window based on the range of light transmissivity provided by the controller.

20 Claims, 2 Drawing Sheets

LOCATION BASED ADJUSTABLE WINDOWS

CROSS-REFERENCE TO RELATED APPLICATION

This application claims priority to and the benefit under 35 U.S.C. § 119(e) of U.S. Provisional Application No. 62/431,910, filed on Dec. 9, 2016, entitled "LOCATION BASED ADJUSTABLE WINDOWS," the disclosure of which is hereby incorporated herein by reference in its entirety.

FIELD OF THE DISCLOSURE

The present disclosure generally relates to a window assembly, and more particularly to a location based adjustable window for a window assembly.

SUMMARY OF THE DISCLOSURE

According to one aspect of the present disclosure, a window assembly includes a window having an electro-optic device configured to limit light transmissivity through the window and a geographic positioning system. A controller is in communication with the geographic positioning system and is configured to limit a range of light transmissivity of the electro-optic device based on a location detected by the geographic positioning system. A manual adjustment control configured to allow a user to adjust the light transmissivity of the window based on the range of light transmissivity provided by the controller.

According to another aspect of the present disclosure, a window assembly includes a window having an electro-optic device configured to limit light transmissivity through the window. A controller is in communication with a geographic positioning system and is configured to limit a range of light transmissivity of the electro-optic device based on a location detected by the geographic positioning system. A manual adjustment control is configured to allow a user to adjust the light transmissivity of the window based on the range of light transmissivity provided by the controller. An automatic adjustment control is configured to automatically change the transmissivity of the windows to comply with local requirements in a particular jurisdiction and to comply with preset user preferences.

According to yet another aspect of the present disclosure, a window assembly includes a window having an electro-optic device configured to limit transmissivity of light through the window. A geographic positioning system is provided. A controller is in communication with the geographic positioning system and is configured to limit a range of light transmissivity of the electro-optic device based on a location detected by the geographic positioning system. A notification system is configured to notify the user when the range of transmissivity has changed.

These and other features, advantages, and objects of the present disclosure will be further understood and appreciated by those skilled in the art by reference to the following specification, claims, and appended drawings.

DETAILED DESCRIPTION

Figure 1:
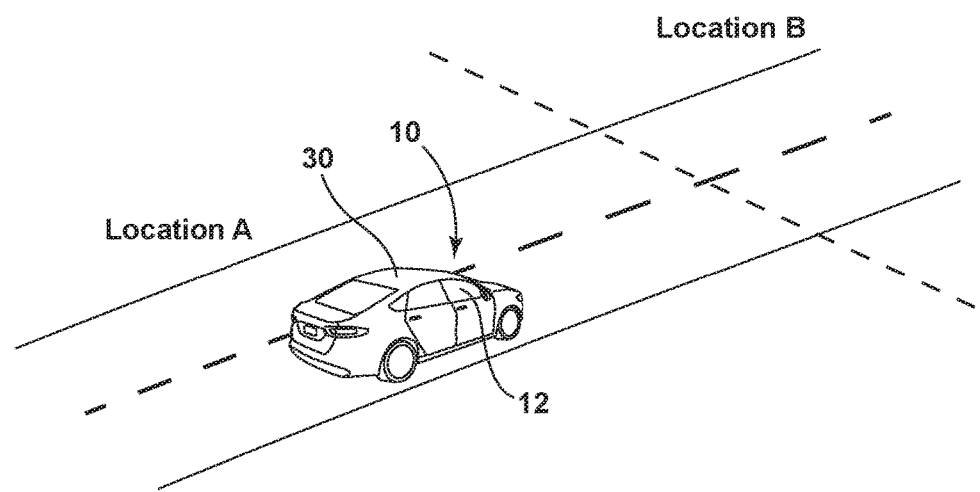
FIG. 1 is a top perspective view of one embodiment of a vehicle utilizing a tintable window assembly of the present disclosure.

The present illustrated embodiments reside primarily in combinations of method steps and apparatus components related to a location based adjustable window. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to the intended viewer, and the term "rear" shall refer to the surface of the device further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
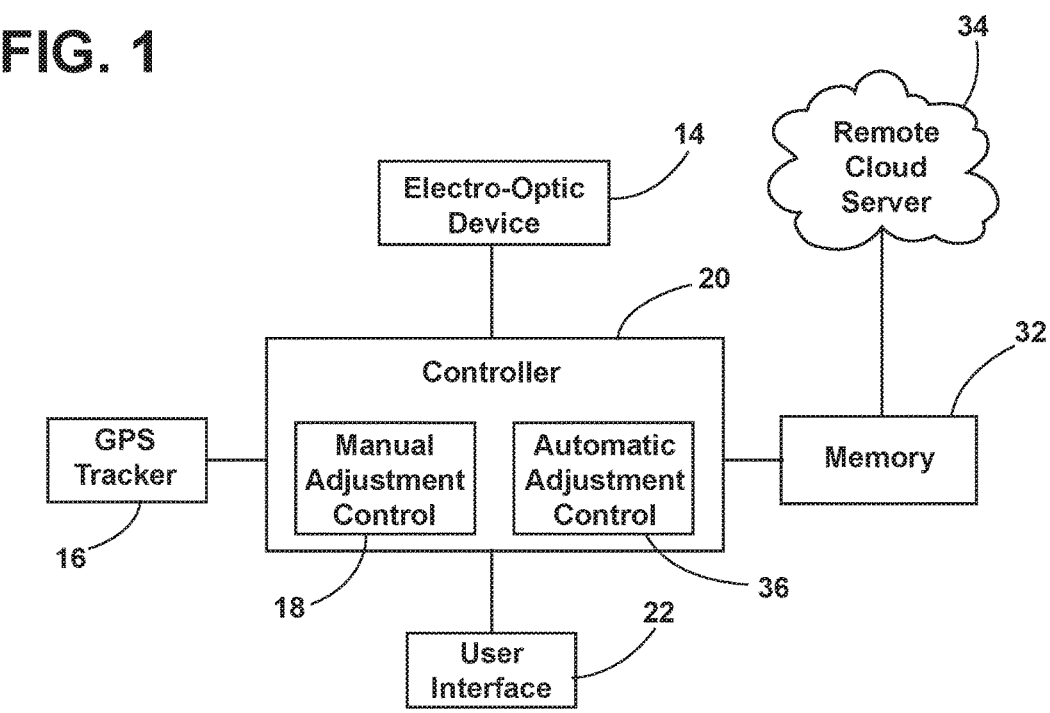
FIG. 2 is a block diagram illustrating features of a tintable window assembly of the present disclosure.
Figure 3:
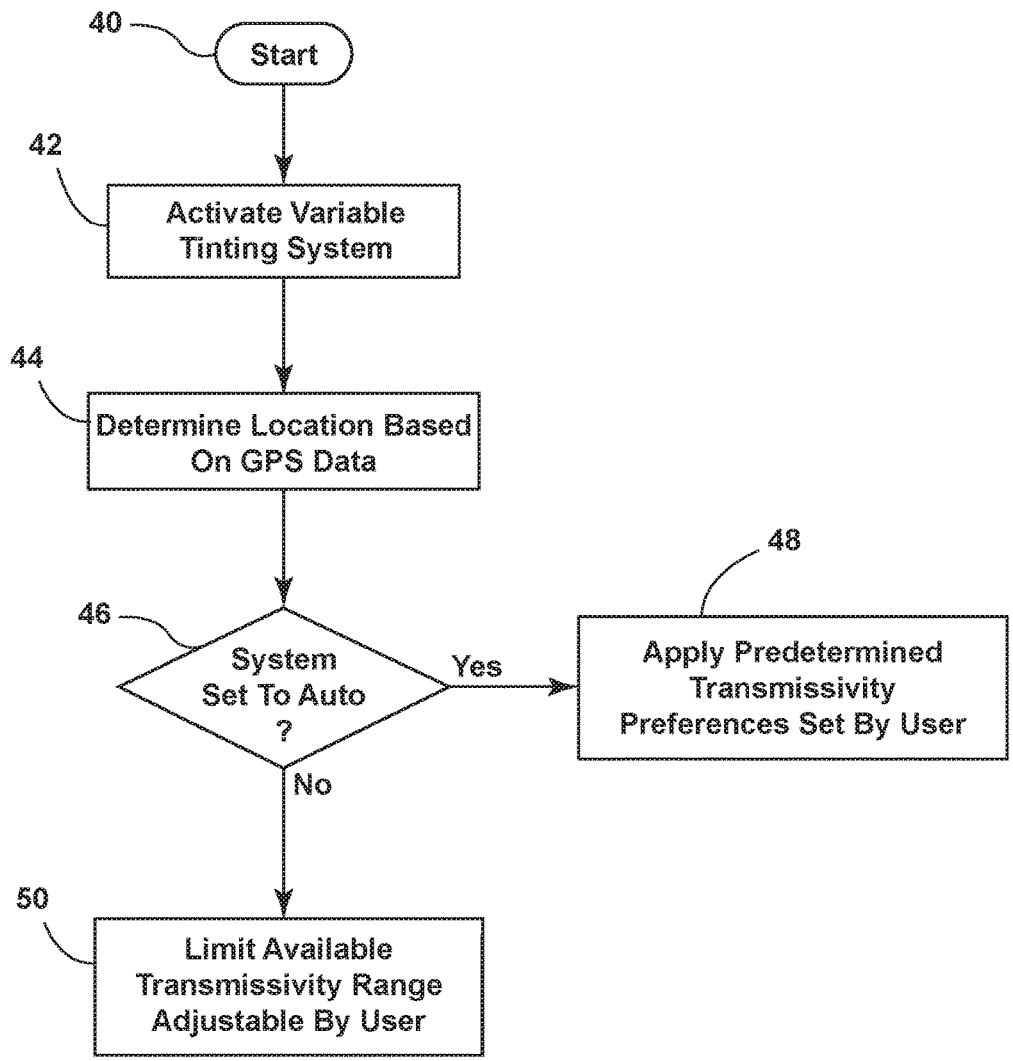
FIG. 3 is a flow chart illustrating a method of using a tintable window assembly of the present disclosure.

Referring to FIGS. 1-3, reference numeral 10 generally designates a window assembly with a variable tinting system that includes a window 12 having an electro-optic device 14 configured to limit transmissivity of light through the window 12. The window assembly 10 includes a geographic positioning system (GPS) 16. A controller 20 is in communication with the GPS 16 and is configured to limit a range of transmissivity of the electro-optic device 14 based on a geographic location detected by the GPS 16. A manual adjustment control 18 in the form of a user interface 22 is configured to allow a user to adjust the light transmissivity of the window 12 based on a legal transmissivity range provided by the controller 20.

With reference again to FIG. 1, the window assembly 10 is generally configured for use with a vehicle 30. The vehicle 30, which includes the GPS 16, is generally configured to drive along a roadway. The controller 20 monitors the relative position of the vehicle 30 based on location information provided by the GPS 16, and when the vehicle 30 moves from a first location A to a second location B, the controller 20 can adjust the available tinting range (transmissivity of light through the window 12) that can be manually adjusted by user. In this instance, the legal limit of transmissivity may change, for example, from a legal range of transmissivity between 100% and 70% in location A to a legal range of transmissivity between 100% and 50% when the vehicle 30 moves to location B. In this instance, the available range of transmissivity changes from 30% (between 100% and 70%) to 50% (between 100% and 50%). The user can then adjust the tint of the windows 12 based on the available legal range, which may be based on rules or legal limits within that particular jurisdiction or geographic area. The controller 20, which is in communication with the GPS 16, also has access to a local memory 32 or a remote location by way of a remote cloud server 34, for example, that can access information related to the available legal tintable range for multiple jurisdictions. Accordingly, the controller 20 can measure a current status of transmissivity against a permissible range of transmissivity stored in the local memory 32 or provided by the remote cloud server 34 and limit the range of transmissivity that is available to the user based on the GPS 16 information. By way of the interface 22, the user can then adjust the relative transmissivity of the window 12, which is limited by the controller 20 by increasing or decreasing the transmissivity through the electro-optic device 14 based on the available range of transmissivity available in that particular jurisdiction.

In an alternate configuration, the controller 20 may automatically adjust the transmissivity of the window assembly 10 as the vehicle 30 passes from location A to location B by way of an automatic adjustment control 36. For example, using the same example as above, when the vehicle 30 passes from location A to location B, the controller 20 may automatically darken the windows 12 from 70% transmissivity to 50% transmissivity based on legal limits within that geographic area. It is also generally contemplated that the controller 20 may be preset to maintain a transmissivity even when moving from a first location to a second location that has increased or decreased transmissivity, as long as the transmissivity is within the legal requirement. For example, if the vehicle 30 is passing from location A (which has a legal transmissivity range of 70% to 100%) and is currently set at 85% transmissivity, when the vehicle 30 passes to location B (which has a legal transmissivity range of 50% to 100%), the vehicle 30 may maintain the same transmissivity (85%) as preset by the user. However, if the vehicle 30, and specifically the window assembly 10, was adjusted to 50% transmissivity in location B, and the vehicle 30 was returning to location A, the window assembly 10 would not maintain a transmissivity of 50% once the vehicle 30 has passed into location A (where the transmissivity range is between 70% and 100%). In this instance, a predetermined percentage of transmissivity, as preset by the user, may be automatically implemented, or a lowest available setting or highest available setting of transmissivity, as preset by the user, may be implemented. For example, the user could specify a 50% available transmissivity setting, which would correlate to the selectin of a 5 on an available range of 1 to 10. In this instance, the transmissivity would change as legal limits change so that the transmissivity is at 50% of the available range (e.g., 85% when the legal range of transmissivity is between 70% and 100%, or 75% when the legal range of transmissivity is between 50% and 100%). Alternatively, the transmissivity could be set at a predetermined value (always 90%), or a lowest (or highest) possible value.

It is also generally contemplated that the transmissivity range within a particular geographic area may be relayed to the user via the interface 22, as well as the current percentage of transmissivity. Further, the user may be notified when the vehicle 30 passes into, or is on course to pass into, a jurisdiction that has a different legal range of transmissivity, or when the current transmissivity percentage of the window assembly 10 will be affected by the legal range of transmissivity that the vehicle 30 will pass into if the vehicle 30 maintains course. Specifically, the controller 20 may anticipate a change in a legal range of transmissivity based on a heading of the vehicle 30. The controller 20 may be configured to relay the anticipated change of legal transmissivity to the user and an anticipated time to reach the change.

It will be generally understood that transmissivity ranges may be stored within the memory 32 of the vehicle 30. Alternatively, the transmissivity ranges may also be stored remotely and implemented wirelessly to the controller 20 based on location data provided by the GPS 16. In the latter example, it is generally contemplated that as transmissivity ranges change in a given jurisdiction or geographic location, the information will automatically be updated to the vehicle 30 as long as a wireless connection is maintained. In the event that a wireless connection is unavailable, the vehicle 30 may resort to data maintained in the local memory 32 of the vehicle 30, which will be the last known transmissivity range in a particular location.

With reference to FIG. 3, one example of an embodiment of the present disclosure is illustrated. In the illustrated embodiment, a variable tinting system is provided (step 40). The variable tinting system is then activated (step 42) and the location of the vehicle 30 is determined based on GPS data provided by the GPS 16 (step 44). In step 46, if the GPS 16 is set to auto, then previously determined tinting (transmissivity) preferences are applied (step 48). The transmissivity preferences will have been previously set by the manufacturer or by the user, which is typically the driver of the vehicle 30. However, any passenger within the vehicle 30 may set the preferences. In the event the GPS 16 is not set to auto, then the available range of transmissivity is limited based on the geographic location of the vehicle 30, which is discerned by the controller 20 through the GPS 16 information (step 50) and the user will only be able to change the tintability within that available range.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A window assembly comprising:
a window including an electro-optic device configured to limit light transmissivity through the window;
a geographic positioning system;
a controller in communication with the geographic positioning system and configured to limit a range of light transmissivity of the electro-optic device based on a location detected by the geographic positioning system; and
a manual adjustment control configured to allow a user to adjust the light transmissivity of the window based on the range of light transmissivity provided by the controller.

2. The window assembly of claim 1, further comprising:
an interface configured to relay transmissivity information to a user.

3. The window assembly of claim 2, wherein the interface relays a percentage of transmissivity to the user and a range of available transmissivity based on the location.

4. The window assembly of claim 1, wherein the controller anticipates a change in a legal range of transmissivity based on a heading of a vehicle, and relays the anticipated change in the legal range of transmissivity to the user and an anticipated time to reach the change.

5. The window assembly of claim 1, wherein the transmissivity of the window is automatically adjusted as the vehicle passes through geographic locations having different legal transmissivity ranges.

6. The window assembly of claim 1, wherein the range of light transmissivity is accessed wirelessly from a remote location by the controller.

7. The window assembly of claim 6, wherein the controller accesses local memory when wireless access to the range limit is unavailable.

8. A window assembly comprising:
a window including an electro-optic device configured to limit light transmissivity through the window;
a controller in communication with a geographic positioning system and configured to limit a range of light transmissivity of the electro-optic device based on a location detected by the geographic positioning system;
a manual adjustment control configured to allow a user to adjust the light transmissivity of the window based on the range of light transmissivity provided by the controller; and
an automatic adjustment control configured to automatically change the transmissivity of the windows to comply with local requirements in a particular jurisdiction and to comply with preset user preferences.

9. The window assembly of claim 8, further comprising:
an interface configured to relay transmissivity information to a user.

10. The window assembly of claim 9, wherein the interface relays a percentage of transmissivity to a user and a range of available transmissivity based on the location.

11. The window assembly of claim 9, wherein the controller anticipates a change in a legal range of transmissivity based on a heading of a vehicle and relays the anticipated change in the legal range of transmissivity to the user and anticipated time to reach the change.

12. The window assembly of claim 8, wherein the transmissivity of the window is automatically adjusted as the vehicle passes through geographic locations having different legal transmissivity ranges.

13. The window assembly of claim 8, wherein the range of light transmissivity is accessed wirelessly from a remote location by the controller.

14. The window assembly of claim 13, wherein the controller accesses local memory when wireless access to the legal range of transmissivity is unavailable.

15. A window assembly comprising:
a window including an electro-optic device configured to limit light transmissivity of light through the window;
a geographic positioning system;
a controller in communication with the geographic positioning system and configured to limit an allowable manual range of light transmissivity of the electro-optic device based on a location detected by the geographic positioning system; and
a notification system configured to notify the user when the range of transmissivity has changed.

16. The window assembly of claim 15, further comprising:
an interface configured to relay transmissivity information to a user.

17. The window assembly of claim 16, wherein the interface relays a percentage of transmissivity to a user and a range of available transmissivity based on the location.

18. The window assembly of claim 16, wherein the controller anticipates a change in a legal range of transmissivity based on a heading of a vehicle and relays the anticipated change in the legal range of transmissivity to the user and anticipated time to reach the change.

19. The window assembly of claim 15, wherein the range of light transmissivity is accessed wirelessly from a remote location by the controller.

20. The window assembly of claim 19, wherein the controller accesses local memory when wireless access to the legal range of transmissivity is unavailable.

* * * * *